United States Patent [19]

Daumas

[11] 3,888,791

[45] June 10, 1975

[54] CATALYSTS FOR THE NON-SELECTIVE OXYCHLORINATION OF HYDROCARBONS

[75] Inventor: Jean Claude Daumas, Orsay, France

[73] Assignee: Rhone-Progil, Courbevoir, France

[22] Filed: Oct. 29, 1973

[21] Appl. No.: 410,967

[30] Foreign Application Priority Data

Oct. 31, 1972 France .............................. 72.38553

[52] U.S. Cl. ............ 252/455 R; 252/454; 252/457; 260/659 A
[51] Int. Cl. ........................ B01j 11/40; B01j 11/32
[58] Field of Search ............... 252/457, 454, 455 R; 260/659 A

[56] References Cited
UNITED STATES PATENTS
3,634,330  1/1972  Michel et al. ................... 260/659 A FOREIGN PATENTS OR APPLICATIONS
969,937    9/1964  United Kingdom ............ 260/659 A
1,016,495  1/1966  United Kingdom ............ 260/659 A Primary Examiner—Carl F. Dees

[57] ABSTRACT

The invention concerns the non-selective catalytic oxychlorination of hydrocarbons, particularly ethylene, by means of hydrogen chloride gas and molecular oxygen. Use is made of catalysts based on silica hydrogel to which there are primarily added magnesium, titanium, copper and an alkali or alkaline earth metal.

These catalysts make it possible to produce, for a given combustion rate, a greater amount of superchlorinated hydrocarbons than with previously known catalysts, and can be used in particular for the non-selective oxychlorination of ethylene.

11 Claims, No Drawings

CATALYSTS FOR THE NON-SELECTIVE OXYCHLORINATION OF HYDROCARBONS

The present invention concerns the non-selective catalytic oxychlorination of hydrocarbons by means of hydrogen chloride gas and molecular oxygen.

It is known that the catalytic oxychlorination of hydrocarbons, and in particular the catalytic oxychlorination of olefins having low molecular weights, is a process which is currently employed for producing chlorinated hydrocarbons, the most important of which is 1,2-dichloroethane which is produced from ethylene and which is the precursor of vinyl chloride from which numerous polymers originate.

However, from the industrial point of view, there is an interest in producing, in a single installation, not only 1,2-dichloroethane but also substantial amounts of other chlorinated hydrocarbons which can be used in particular as solvents. The oxychlorination operation which leads to such results is referred to as non-selective.

In French Pat. No. 1,579,562, description is made of catalysts for the oxidation of hydrochloric acid by molecular oxygen, intended for use in the production of chlorinated hydrocarbons, and in French Pat. application No. 71.05677 filed on February 19, 1971 on carriers for catalysts formed of silica and magnesia and use of such carriers for the production of oxychlorination catalysts, catalysts are described which are suitable for non-selective oxychlorination operations. The essential features of such catalysts lie in the nature of the carriers which comprise silica to which additions are made of compounds of metals of groups IIa, IIIa and IVa, magnesium being the most recommended of such metals. Some of these carriers can comprise alumina and the catalytically active part can comprise rare earth metals in addition to copper and alkali and/or alkaline earth metals.

Such catalysts in particular make it possible simultaneously to produce 1,2-dichloroethane and industrially attractive amounts of superchlorinated hydrocarbons, such as trichloroethane and tetrachloroethane, by the oxychlorination of ethylene. However, in some cases it may be of utility to be able to increase the ratio between the amount of such superchlorinated hydrocarbons and the total amount of chlorinated hydrocarbons produced, without the amount of ethylene, destroyed by combustion, exceeding economically acceptable limits. To achieve an increase in the amount of superchlorinated hydrocarbons produced, it is necessary to increase the temperature of the reaction and/or the contact time. However, in industrial practice, the contact times are still relatively high, of the order of some ten seconds, which means that, to achieve a given result, the temperatures to be used can be defined only in dependence on such contact times, always lower by some tens of degrees than those used in the laboratory.

It has now been found that the most suitable catalysts for attaining such results are those which, in addition to the catalytically active portion which is generally used and which is formed of compounds, generally chlorinated compounds, of copper and alkali and/or alkaline earth metals, also comprise compounds of titanium and magnesium. In addition, these catalysts can contain, as an accessory, alumina and rare earth metals. The base component of such catalysts is silica which is initially in hydrogel form.

It has also been found that when titanium is present in these catalysts it is possible to attain industrially a greater production of the more highly superchlorinated hydrocarbons. This offers obvious attraction when these substances are particularly sought.

In these new catalysts, the amount of titanium added can be varied in accordance with the desired results but generally it is unnecessary to make use of more than 4 percent by weight of titanium with respect to the finished catalyst, and the preferred amount varies within the range of 1 to 3 percent.

The amount of magnesium compound, calculated in the form of magnesia, can vary within fairly wide limits and is employed in the catalyst preferably in an amount within the range of 5 to 30 percent by weight.

Finally, the amount by weight of copper in the finished catalyst can vary from 2 to 10 percent and preferably in an amount within the range of 2 to 4 percent, and the alkali and/or alkaline earth metal can be employed in the finished catalyst in an amount within the range of 0.5 to 3 percent and preferably 1 to 2 percent by weight of the finished catalyst.

The catalysts of the invention can be prepared in many different ways. Generally, the preferred way is to start with the initial carriers of silica hydrogel, which may possibly contain alumina, and impregnate the silica hydrogel one or more times with different solutions embodying various other components, or with a single solution containing the various components. The impregnation steps can be followed by drying and calcination steps, the aim of the latter often being to modify the structural and textural properties of the treated substances. These modifications result in a reduction in the specific surface area of the initial carriers, such reduction being particularly substantial after calcining silica hydrogel carriers impregnated by magnesium salts. Therefore, in a preferred mode, in order to define the specific surface areas of the finished catalysts, it is desirable to commence by impregnating silica hydrogel carriers with a solution of a magnesium salt, calcine the carriers after drying so as to produce specific surface areas which can be from 40 to 400 sq.m/g, then impregnate the modified carriers, in one or more steps, by solutions for providing the titanium, copper, and alkali and/or alkaline earth metals. Titanium is most easily added by solutions in the form of its chlorides and oxychlorides, although its other salts can be used. Magnesium can be added from solutions of various salts of which the chloride and the nitrate are particularly recommended, although other salts capable of giving magnesia by calcination can be used. Copper together with alkali and/or alkaline earth metals and any rare earth metals are preferably added by solutions as their chlorides. However, in the most frequent mode, the components other than silica are rather in the form of oxides or chlorinated and oxychlorinated compounds and the metallic compounds used are then preferably selected from those which are capable of achieving this state in the course of the oxychlorination operations, in the event that the chlorides have not been used.

In the following examples, the catalysts used were prepared by impregnation, by means of a solution containing the chlorides of copper, potassium and titanium, or for the purposes of comparison, only copper and potassium of carriers which had previously been modified by impregnation by means of magnesium nitrate. The initial carriers were silica hydrogel microballs produced by coagulation of silica sol droplets in a water-immiscible liquid. This impregnation step is followed by a calcination step which, depending on its condition, gives modified carriers having a greater or lesser specific surface area.

In these various examples only the most interesting of the parameters are varied, that is to say, the specific surface area of the silica carriers which are modified by the addition of a magnesium salt, and the proportion of titanium, the action of which is the main object of the invention. The proportion of magnesium compound, calculated in the form of magnesia, can be fairly widely varied, as mentioned hereinbefore, and in all the examples, use is made of a suitable average value.

In consequence, the finished catalyst in all the catalysts tested contain 20 percent by weight of magnesium compound, calculated in the form of magnesia, 3.25 percent by weight of copper in the form of cupric chloride and potassium chloride, the atomic ratio K/Cu being 0.6. The dimensions of the grains of these catalysts are graduated within the range of 100 and 150 $\mu$ so that they can be used in the fluidized state.

These examples relate to laboratory tests enabling the catalysts to be defined, and a pilot test under substantially industrial conditions under which the contact times are much higher.

The laboratory tests are all carried out with a constant contact time of 1 second in a small reaction vessel made of hard glass and having an internal diameter of 2 cm. The catalyst to be tested is placed in the reaction vessel to a height at rest of 7.5 cm. Fluidization of the catalyst is effected by a gas stream formed by a mixture of ethylene, hydrogen chloride gas and air, the molecular ratio $O_2/C_2H_4$ being equal to 0.7 and the molecular ratio $HCl/C_2H_4$ being equal to 2.25.

At the outlet from the reaction vessels, the composition of the gas stream is determined by chromatography and the results are evaluated by calculating the following ratios:

— total rate of conversion $X_g$ of ethylene,

— ratio $\phi$ between the sum of the amounts of trichloroethane and tetrachloroethane produced, and the total sum of the amounts produced of chlorinated paraffinic hydrocarbons; this ratio gives information as to the aptitude of the catalysts to give a mixture of chlorinated hydrocarbons, that is to say, expresses the degree of non-selectivity, — selectivity $S_{CO_2}$ which is the ratio between the amount of ethylene converted into $CO_2$ and the total amount of reacted ethylene, — ratio $\phi/S_{CO_2}$ which gives information as to the gain obtained on non-selectivity when a given combustion rate is accepted, — selectivity $S_{T_4}$ which is the ratio between the amount of ethylene converted into tetrachloroethane with respect to the total amount of reacted ethylene, — ratio $S_{T_4}/S_{CO_2}$ which gives information as to the gain obtained in the production of the most highly superchlorinated hydrocarbons, when a given combustion rate is accepted.

EXAMPLE 1

This example is intended to show the influence of the addition of titanium to the catalysts, on non-selectivity and combustion. The tests were carried out at temperatures of 360°C and 380°C for a reference catalyst and three catalysts containing different amounts of titanium, all being prepared on a carrier of silica modified by the addition of magnesia and having a specific surface area of 110 sq.m/g. These results are indicated in the following Table I including the values of $X_G$, $\phi$, $S_{CO_2}$ and $\phi/S_{CO_2}$.

TABLE I

| % by weight of titanium in the catalyst | | $X_G$ | $l$ | $S_{CO_2}$ | $l/S_{CO_2}$ |
|---|---|---|---|---|---|
| Reference | 360°C | 70 | 16.8 | 0.8 | 21 |
| 0% | 380°C | 71.5 | 23 | 1.2 | 19 |
| 1% | 360°C | 70 | 18.1 | 0.7 | 26 |
|  | 380°C | 72 | 24 | 0.9 | 27 |
| 2% | 360°C | 68 | 16 | 0.4 | 40 |
|  | 380°C | 71 | 22 | 0.6 | 37 |
| 3% | 360°C | 69 | 12.5 | 0.6 | 21 |
|  | 380°C | 72 | 18 | 0.9 | 20 |

These results clearly show the attraction in adding titanium which makes it possible to increase the degree of non-selectivity, at substantially constant combustion rate, by utilization of contact times and temperatures. These results also define the most favorable proportions of titanium.

EXAMPLE 2

This example gives the results produced at various temperatures with catalysts containing 2 percent by weight of titanium, prepared on carriers having various specific surface areas, as compared to catalysts without titanium.

The results are entered in Table II below, which gives the values of $X_G$, $\phi$, $S_{CO_2}$, $\phi/S_{CO_2}$, and the values of selectivity as regards conversion to tetrachloroethane $S_{T_4}$, the ratio $S_{T_4}/S_{CO_2}$.

TABLE II

| Catalysts Specific surface area of the carriers in sq.m/g. | % Ti | Temp. °C | $X_G$ | $l$ | $S_{CO_2}$ | $l/S_{CO_2}$ | $S_{T_4}$ | $\frac{S_{T_4}}{S_{CO_2}}$ |
|---|---|---|---|---|---|---|---|---|
| 70 | Reference | 340 | 67 | 8.5 | 0.3 | 28 | 0.8 | 2.7 |
|  |  | 360 | 70 | 16.3 | 0.6 | 27 | 2.6 | 4.3 |
|  | 0% | 380 |  |  |  |  |  |  |
|  |  | 340 | 68 | 9.6 | 0.2 | 48 | 1.3 | 6.5 |
|  | 2% | 360 | 71 | 16.5 | 0.3 | 55 | 3.2 | 10.6 |
|  |  | 380 | 71 | 23.5 | 0.5 | 47 | 5.1 | 10.2 |
| 110 | Reference | 340 |  |  |  |  |  |  |
|  |  | 360 | 70 | 16.8 | 0.8 | 21 | 5 | 6.2 |
|  | 0% | 380 | 71.5 | 23 | 1.2 | 19 | 7.2 | 6 |
|  |  | 340 |  |  |  |  |  |  |
|  | 2% | 360 | 68 | 16 | 0.4 | 40 | 4.5 | 11.2 |
|  |  | 380 | 71 | 22 | 0.6 | 37 | 7.2 | 12.0 |

TABLE II — Continued

| Catalysts Specific surface area of the carriers in sq.m/g | % Ti | Temp °C | $X_G$ | $\phi$ | $S_{CO_2}$ | $\phi/S_{CO_2}$ | $S_{T4}$ | $\frac{S_{T4}}{S_{CO_2}}$ |
|---|---|---|---|---|---|---|---|---|
| | Reference | 340 | 67 | 14.6 | 2.4 | 6.1 | 4.7 | 2.0 |
| | | 360 | | | | | | |
| 375 | 0% | 380 | | | | | | |
| | | 340 | 70.5 | 11.0 | 0.85 | 11.8 | 4.0 | 4.7 |
| | 2% | 360 | | | | | | |
| | | 380 | | | | | | |

This table shows some of the results concerning the catalyst produced on a carrier having a specific surface area of 110 sq.m/g as in Example 1. These different results clearly show the favorable action of titanium on combustion rate which can be kept constant in spite of an increase in $\phi$, and on the increase in relative production of the higher chlorinated hydrocarbon.

EXAMPLE 3

This example concerns comparative pilot tests carried out in a reaction vessel having a diameter of 600 mm in which the height of the catalyst bed at rest is 10 m; the proportions of the gaseous mixture formed by ethylene, oxygen and hydrogen chloride gas are defined by the ratio: $HCl/C_2H_4 = 2.6$ and $O_2/C_2H_4 = 0.8$. The pressure used is 7 bars and the contact time is 20 s. Under these conditions the total ethylene conversion rate $X_G$ is always substantially 100 percent. The two catalysts tested are those of Example 1, produced on carriers having a specific surface area of 110 sq.m/g, which are formed of silica and magnesia and which in one instance contains 2% of titanium and in the other instance contains no titanium.

Table III below indicates the results obtained for $\phi$, $S_{CO_2}$, $S_{T_4}$, $\phi/S_{CO_2}$, and for $S_T$ which is the degree of selectivity in conversion to trichloroethane. The two temperatures used are 320°C and 340°C.

TABLE III

| Catalyst | Temperature °C | $\phi$ | $S_{CO_2}$ | $S_{T3}$ | $S_{T4}$ | $\phi/S_{CO_2}$ |
|---|---|---|---|---|---|---|
| Reference | 320 | 12.5 | 1.8 | 11 | 1.3 | 7 |
| | 340 | 25 | 3.3 | 16 | 4.0 | 7.5 |
| 2% of titanium | 320 | 18.5 | 1.5 | 13 | 3.0 | 12.5 |
| | 340 | 40 | 2.5 | 28 | 8.0 | 16 |

These tests clearly show that the titanium-bearing catalyst makes it possible to increase the degree of non-selectivity with a constant combustion rate, as well as the relative amount of more highly superchlorinated hydrocarbons.

It will be understood that these various examples are not intended to limit the invention to the catalysts used and to the operations described. Thus, for example, catalysts produced by other methods of preparation in which titanium is added at the same time magnesium is added to the initial silica hydrogel carriers, as well as catalysts of different shapes and grain dimensions, such as those for example which can be used in a fixed bed, are also part of the invention. Moreover, these same titanium-bearing catalysts can be used with gaseous compositions containing chlorine, as well as diluents and inert gases, as is frequently the same in industrial operations.

It will be understood that changes may be made in the details of formulation and operation, without departing from the spirit of the invention, especially as defined in the following claims.

I claim:

1. Catalysts for the non-selective oxychlorination of hydrocarbons to produce superchlorinated hydrocarbons at temperatures of at most equal to 380°C, said catalysts being formed primarily of silica originating from silica hydrogel and containing 5 to 30 percent by weight of a magnesium compound expressed as magnesia, up to 4 percent by weight of titanium in the form of a compound of titanium, 2 to 10 percent by weight of copper in the form of a compound of copper, and 0.5 to 3 percent by weight of a compound of a metal selected from the group consisting of an alkali metal and an alkaline earth metal.

2. Catalysts as claimed in claim 1 in which the temperature of the oxychlorination is about 340°C.

3. Catalysts as claimed in claim 1 in which the catalyst includes alumina and rare earth metals.

4. Catalysts as claimed in claim 1 in which the silica hydrogel is in the form of microballs.

5. Catalysts as claimed in claim 1 in which the compounds of magnesium are selected from the group consisting of the chloride and nitrate compounds which are capable of being decomposed to form magnesia by calcination.

6. Catalysts are claimed in claim 1 in which the compounds of titanium are selected from the group consisting of the chlorides and oxychlorides.

7. Catalysts as claimed in claim 1 in which the amount of titanium, expressed in the form of metal, is within the range of 1 to 3 percent by weight of the catalyst.

8. Catalysts as claimed in claim 1 in which the copper is present in an amount within the range of 2 to 4 percent by weight and the alkali and/or alkaline earth metal is present in an amount within the range of 1 to 2 percent by weight.

9. Catalysts as claimed in claim 1 in which the alkali metal is potassium.

10. A method of producing the catalysts of claim 1 comprising impregnating silica hydrogel microballs with a solution of a magnesium compound, calcining the impregnated microballs so that their specific surface areas are from 40 to 400 sq. m/g, and impregnating the calcined microballs with a solution containing 5 to 30 percent by weight of a magnesium compound expressed as magnesia, up to 4 percent by weight of titanium in the form of a compound of titanium, 2 to 10 percent by weight of copper in the form of a compound of copper, and 0.5 to 3 percent by weight of a compound of a metal selected from the group consisting of an alkali metal and an alkaline earth metal, and drying the impregnated calcined microballs.

11. The method as claimed in claim 10 in which the alkali metal is potassium.

* * * * *